Patented Aug. 13, 1929.

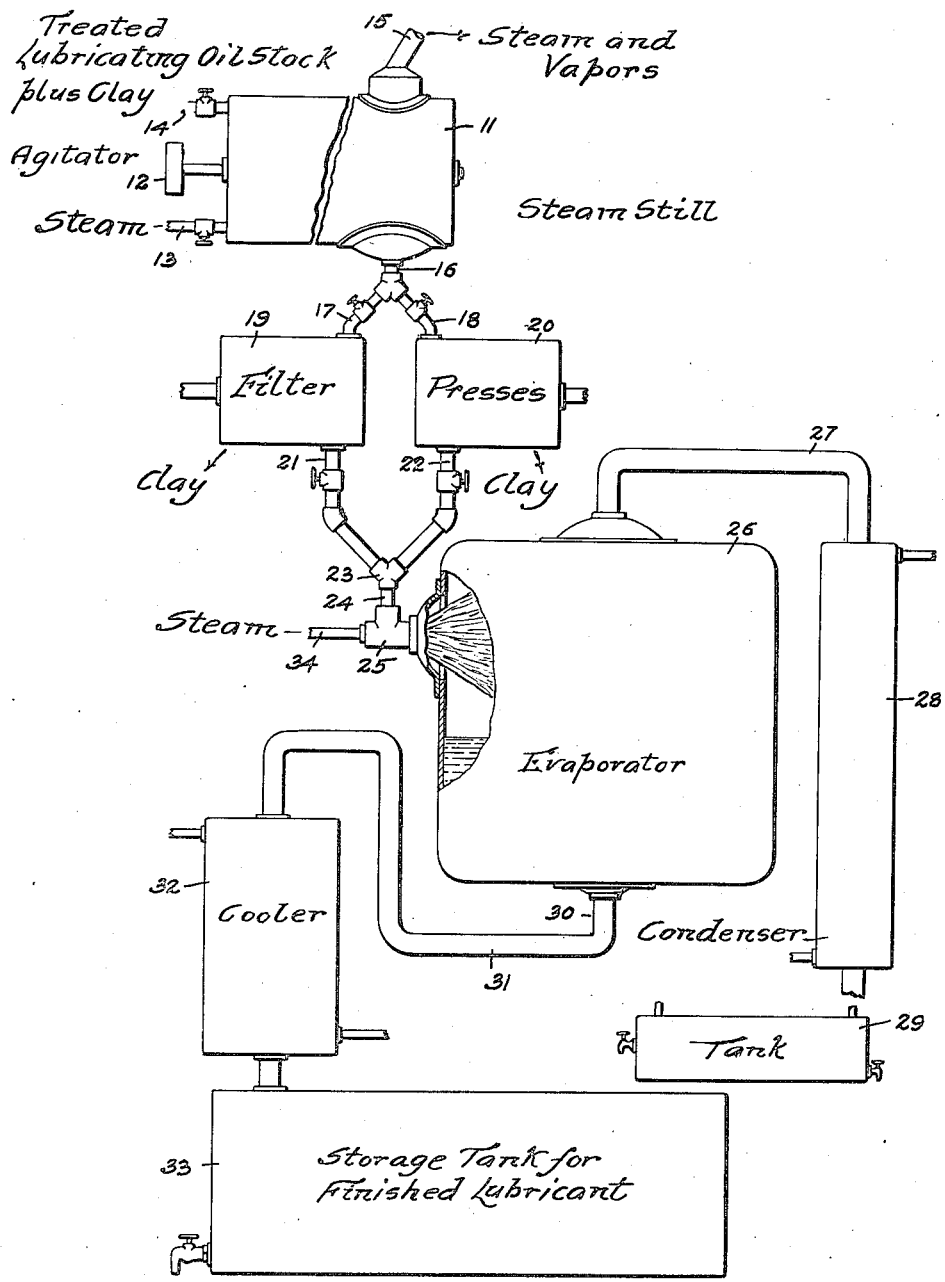

1,724,510

UNITED STATES PATENT OFFICE.

GEORGE F. OLSEN, OF LOS ANGELES, CALIFORNIA, ASSIGNOR TO GENERAL PETROLEUM CORPORATION OF CALIFORNIA, A CORPORATION OF DELAWARE.

METHOD OF STABILIZING CLAY-TREATED OILS.

Application filed August 31, 1926. Serial No. 132,802.

Various types of clay (such as montmorillonite, Death Valley clay, and others) are currently used to neutralize and decolorize mineral oils, the oil and clay being heated together and the oil filtered from the spent clay. My present invention relates to a process in which, heat having been applied to the mixture of oil and clay, the filtration is conducted at a relatively high temperature and the oil thereafter atomized with steam before it is permitted to return to atmospheric temperature.

This hot filtration and hot atomization produce immediate separation from the oil of undesired volatile bodies, a non-oxidizing fluid such as steam or an inert gas being used for the atomizing effect, and an evaporator utilized to separate the stabilized oil from the vapors of certain odorous and deleterious light bodies.

It is a known fact that petroleum oils which have been treated with clay for the removal of acidity or color almost invariably have a foreign smell, and that they are likely to deteriorate in color. It is believed that the foreign odor and the tendency to revert in color are due to the presence of small amounts (from $\frac{1}{10}$ of 1 percent to 2 percent) of chemically unstable unsaturated hydrocarbons, of low molecular weight and low boiling point, which are produced by the chemical activity of the clay at the temperatures required to get satisfactory decolorizing effects therefrom. The darkening of these unstable bodies is augmented by subsequent heating, and especially by heating under conditions favorable to oxidation.

Heretofore, these bodies have either been left in the oil, or, after the clay has been removed (in the usual manner) they have been expelled by reheating the oil and blowing it with steam. This reheating has added an avoidable step, disadvantageous not only on account of its cost but because of an invariable darkening effect upon the oil, it being impossible to reheat the oil to the temperature necessary to volatilize the unstable elements without a serious reversion in color.

It is accordingly a primary object of my invention to provide means and methods whereby a clay treated oil may be substantially freed of deleterious volatile bodies at a low cost and in such manner as to remove the foreign odor and to avoid reversion in color.

Other objects of my invention will appear from the following description of an illustrative embodiment thereof, taken in connection with the appended claims and the accompanying drawings, in which The figure is an entirely diagrammatic elevational view adapted to serve also as a flow sheet, parts being broken away.

Referring to the figure, 11 is a still provided with an agitator 12, a valved steam inlet 13, a valved pipe for the introduction of oil and clay at 14, near the inlet end of said still, a vapor outlet at 15, a residuum outlet at 16, at the bottom of said still and near its outlet end, remote from the inlet 14.

The outlet 16 communicates by valved branch pipes 17 and 18 with filter presses 19 and 20, suitable for alternative use in continuous operation; and valved outlets 21 and 22 from said filter presses converge at 23 and communicate by a short pipe 24, with a steam injector 25, placed at the inlet of an evaporator 26.

The evaporator 26 is provided with a vapor outlet 27 which communicates by way of condenser 28, with a storage tank 29, and with a bottom outlet 30 for oil not evaporated during atomization. A predetermined level of oil is maintained in the evaporator 26, by the provision of the trap 31, and oil flowing out said trap is promptly reduced in temperature by the cooler 32, communicating with a storage tank 33 for the finished lubricant.

Using the apparatus described and operating continuously, I introduce through the inlet 14 of the still 11 an oil to be treated and a suitable clay. The oil may be any oil suitable for use as a lubricant, and is admixed (in advance of its admission into the still 11 or subsequently thereto) with an alkali or an adsorbent clay or with a combination of both, enough clay being added to complete the neutralization of the oil or to produce therein a desired color.

The oil containing the clay is then heated, preferably with agitation, to the desired temperature (which may vary from 300° F. to 600° F.) steam and vapors being withdrawn through the vapor outlet 15. The residual mass of oil and clay (which may be renewed by introduction of additional oil and clay through the inlet 14 as it is withdrawn through the outlet 16) is promptly filtered, while still hot, in presses 19 and 20, air being excluded therefrom and the presses so operated as to produce continuous outflow of filtered oil through the valved pipes 21 and 22 toward the injector 25.

The aforesaid filtration may take place at a temperature between 350° and 400° F., the filtered oil being excluded from air and prevented from substantial cooling up to the moment of the steam atomization by which it is projected into the evaporator 26.

The steam introduced through a pipe 34 should be at substantially the same temperature as the oil so that no heat may be transferred from oil to steam and thus lost.

The object of the atomization with steam is to subdivide the oil containing volatile impurities into the minute particles which will present the largest ratio of surface to mass, thus making it possible for those volatile bodies to be completely evaporated from the oil solely by utilizing the residual sensible heat of the oil.

The valuable oil, now stripped of its odorous and color-unstable constituents, collects in the bottom of the evaporating chamber and passes thence through the cooler 32, where it is so reduced in temperature as to prevent oxidation on contact with air during storage in the tank 33.

The above described process results in an oil which is not only free from objectionable odor but also stable as to color, there being practically no unstable compounds left therein.

Dependent upon the condition and character of the oil introduced, upon the temperature at which the same is delivered to the injector 25 and upon the temperature of the steam introduced, the quantity of such steam may amount to about 10% (as measured in liquid form) of the oil treated. The products escaping from outlet 27 of evaporator 26 may go to waste or may be saved by means such as the condenser 28, communicating with a storage tank 29, and utilized as fuel or otherwise.

I would have it understood that heating oil with clay, blowing steam through and agitating the mixture, and filtering the mixture while hot, are all current practice and are no part of my present invention. What I have invented and wish to claim as broadly as the state of the art will permit, is set forth and limited solely by the attached claims.

I claim as my invention:

1. A method of removing deleterious volatile substances from lubricating oils which have been heated with clay and separated from said clay while still hot, which consists in subjecting said separated oil, while still hot, to atomization by a non-oxidizing fluid to promote vaporization of said volatile substances.

2. A method substantially as defined in claim 1 in which the atomization is effected by steam.

3. A method of removing deleterious volatile substances from lubricating oils which have been heated with clay and separated from said clay, which consists in subjecting said separated oil, in a heated condition, to atomization into an atmosphere of non-oxidizing fluid to promote vaporization of said volatile substances.

4. A method substantially as defined in claim 3 in which the oil is atomized into an atmosphere of steam.

In testimony whereof, I have hereunto set my hand at Los Angeles, California, this 10th day of August, 1926.

GEORGE F. OLSEN.